United States Patent [19]

Kempf

[11] Patent Number: 5,357,316
[45] Date of Patent: Oct. 18, 1994

[54] ELECTROPHOTOGRAPHIC COPYING DEVICE

[76] Inventor: Georg-Ulrich Kempf, Augustastrasse 8, 2057 Wentorf, Fed. Rep. of Germany

[21] Appl. No.: 10,443

[22] Filed: Jan. 22, 1993

Related U.S. Application Data

[63] Continuation of Ser. No. 884,048, May 14, 1992, abandoned, which is a continuation of Ser. No. 403,914, Sep. 1, 1989, abandoned, which is a continuation of Ser. No. 176,936, Apr. 4, 1988, abandoned.

[30] Foreign Application Priority Data

Apr. 7, 1987 [DE] Fed. Rep. of Germany ....... 3711701

[51] Int. Cl.$^5$ ............................................. G03G 21/00
[52] U.S. Cl. ...................................... 355/202; 355/241
[58] Field of Search ......................... 355/55–61, 355/75, 200, 229, 230, 240, 241, 243, 202, 210

[56] References Cited

U.S. PATENT DOCUMENTS

| 3,102,449 | 9/1963 | Sabel et al. ............................ 355/11 |
| 3,398,638 | 8/1968 | Frohlich ................................. 355/60 |
| 3,597,071 | 7/1971 | Jones ..................................... 355/202 |
| 4,048,641 | 9/1977 | Cieplik et al. ...................... 355/58 X |
| 4,107,714 | 8/1978 | Raab ................................... 355/58 X |
| 4,111,542 | 9/1978 | Mailloux et al. ................. 355/11 X |
| 4,165,934 | 8/1979 | Zimmet ............................ 355/75 X |
| 4,394,084 | 7/1983 | Kuehnle ........................... 355/11 X |
| 4,521,097 | 6/1985 | Kuehnle et al. ..................... 355/210 |
| 4,641,944 | 2/1987 | Honda et al. ........................... 355/1 |
| 4,665,577 | 4/1987 | Ikuta ................................... 355/202 |
| 4,887,126 | 12/1989 | Hougaard ........................... 355/75 |

FOREIGN PATENT DOCUMENTS 60-20685 2/1985 Japan .

Primary Examiner—R. L. Moses
Attorney, Agent, or Firm—Kinney & Lange

[57] ABSTRACT

An electrophotographic copier for forming an image on the exposing device of the copier which includes a camera lens adapted to form an image of outside objects like a camera.

2 Claims, 2 Drawing Sheets

ELECTROPHOTOGRAPHIC COPYING DEVICE

This is a file wrapper continuation of application Ser. No. 07/884,048 filed on May 14, 1992, abandoned which is a continuation of Ser. No. 07/403,914 filed Sep. 1, 1989, abandoned as of the date of this application which is a continuation of Ser. No. 176,936, filed Apr. 4, 1988, abandoned.

BACKGROUND OF THE INVENTION

1. Field of the Invention

The invention refers to the presentation of images to an electrophotographic copying device.

2. Description of the Prior Art

Such a copying device has become known by a current prospectus of the firm Canon referring to a colour copying device "COLOR LASER COPIER-1". From this publication it is also known to place a dia-projector on the copier, the projector including a projection objective or lens to form an image on the entrance window of the copier. By this, electrophotographic copies can be made from diapositives. By this, it is possible to obtain more rapidly and simply paperprints from diapositives in comparison with chemographic reproduction.

The known device, however, is restricted to the reproduction of diapositives.

SUMMARY OF THE INVENTION

It is the object of the present invention to provide a device of the kind mentioned above by which arbitrary objects can be copied in an electrophotographic way.

According to the invention, an electrographic copier is provided with a camera objective or lens by which external objects can be formed to an image on the exposing device of the copier for the purpose of electrographic reproduction. By this, for the first time it is enabled to apply an electrographic copier as a kind of camera to copy arbitrary objects. For example, arbitrary relatively large images can be copied which normally is not possible with conventional copiers which usually are restricted to certain sizes of the image.

Preferably, the objective includes means for varying the sharp focusing of the objective, thus making it possible to sharply reproduce objects having an essentially arbitrary distance.

In the preferred embodiments, the objective includes means for varying the diaphragm of the objective, which makes it possible to influence the depth of the focal field which above all is of importance in connection with the reproduction of three-dimensional objects.

Further, means for illuminating the object are preferably provided so that a high illumination of the object necessary for the projection can be secured under consideration of light losses.

And preferably, the space between the objective and an image entrance window of the copier is light-tight enclosed so that disturbing light can be excluded from the electrophotographic copying process.

According to another embodiment of the invention, the optical device can include a fibre optical device. By this, it is for example possible to copy interior body areas by means of an entroscope and to have the copies immediately available without a photochemic developing process. By the way, the invention enables the deflection of images from an X-ray screen onto the exposing device of the copier and to obtain a paperprint of the X-ray image.

Some copiers include converting means so that it makes no difference how the image in the copier to be scanned is oriented. In case such converting means are not inherent in the copier, it is appropriate to provide a mirror arrangement by which the images of the object is turned about 180° so that in the copier a correctly oriented copying of the object takes place.

If the illumination of the object is too weak, it can be appropriate to provide a low-light amplifier (multiplier) associated with the copier or the objective.

In the drawings, two examples of the invention are diagrammatically illustrated.

DETAILED DESCRIPTION OF THE PREFERRED EMBODIMENTS

Figure 1:
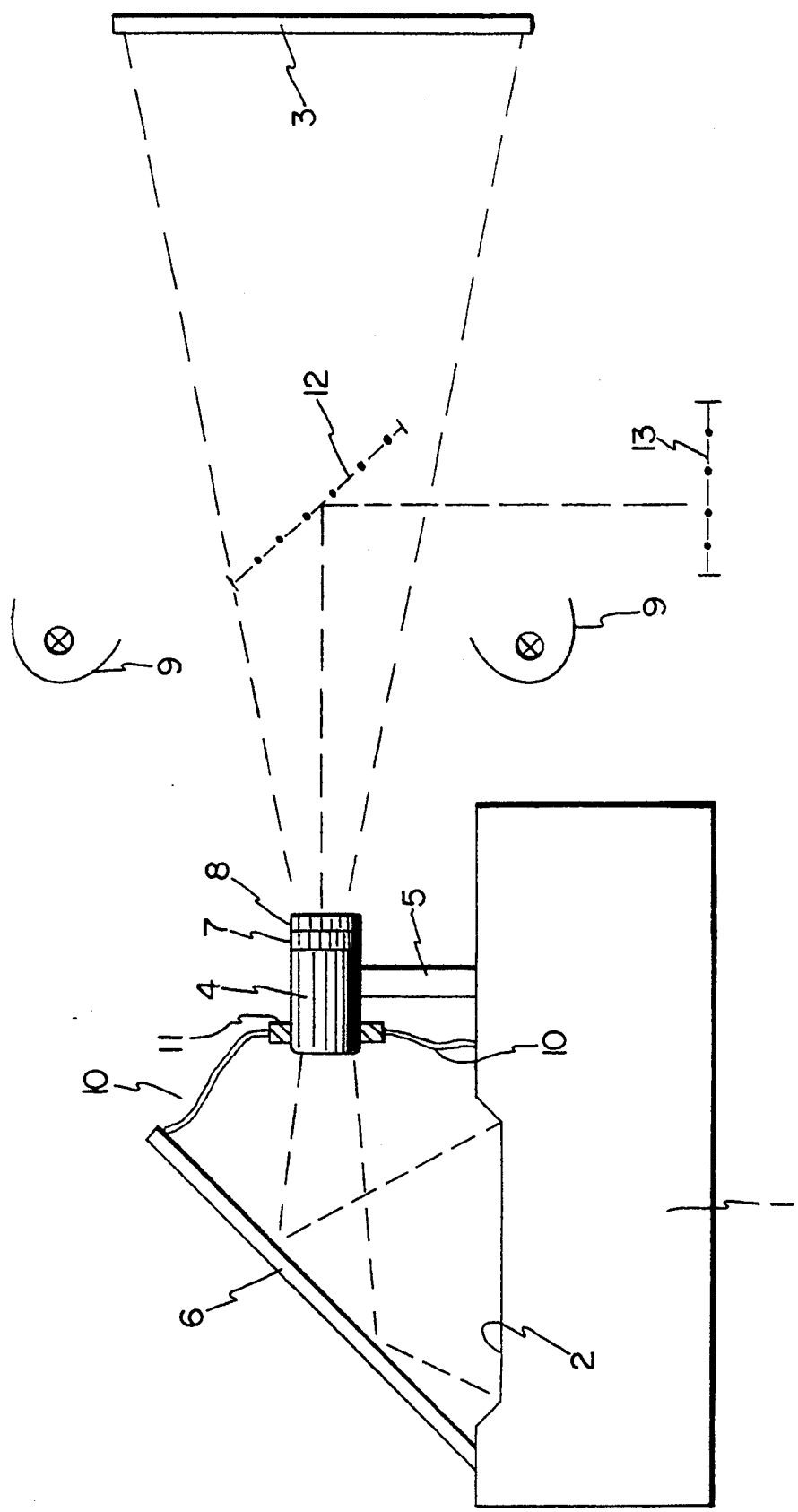
FIG. 1 diagrammatically shows a copier according to the invention including a camera lens.

FIG. 1 shows a copier 1 which can be used as office copier and includes an entrance window 2 usually covered by a glass plate and normally serving as image carrier during the normal copying process. The usually provided, however not shown, cover covering the entrance window 2 is removed or turned away, respectively.

With the invention, the copier 1 is to be used for the reproduction of a remotely placed object 3. This for example can be defined as an image plate whereon drawings or the like having a large format could be attached.

The copier 1 is equipped with an objective 4 which is mounted on the top surface of the copier 1 by an arm 5. The objective 4 is of suitable structure and also of the kind which for example is used for large format cameras.

In the embodiment shown, the axis of the objective 4 extends parallel to the surface of the entrance window 2 for leaving an access to the location where the object 3 is positioned. Therefore, a deflection mirror 6 is provided for the copier 1 including an angle of 45° relative to the entrance window 2 or the axis of the objective 4, respectively, through which the objective 4 forms an image of the object 3 on the entrance window 2 as shown by the dashed lines.

The objective 4 can be provided with a fixed focusing means. However, it is advantageous to provide a means for a variable focusing which in the embodiment shown is formed as a focusing rotary ring 7 at the objective 4. By this, different distances from the object 3 can by considered to achieve an exact range focus control.

It is furthermore advantageous to provide means for a lens aperture setting in the form of a diaphragm ring 8 rotatably supported by the objective 4. By this, the focusing can be influenced above all with the reproduction of three-dimensional objects or to adjust a correct exposing with a predetermined constant illumination.

As an alternative to the focusing rotary ring 7 for the variation of the focal depth, longitudinal adjustment means could be provided, for example including a threaded shaft by which the objective 4 can be displaced along its axis, e.g. relative to arm 5 or in conjunction with the arm 5 relative to the copier 1.

In FIG. 1, further lamps 9 are shown, e.g. conventional photo lamps by which the object 3 can be illuminated in a suitable manner.

If the environment is not bright, the space between the objective 4, the deflection mirror 6 and the entrance window 2 can be left free. However, if disturbing light is entering the entrance window 2, it can be advantageous to seal this space against light. To this purpose a cover sheet or enclosure 10 is provided which is attached to the objective 4 by a ring 11, the cover sheet 10 being attached to the edges of the mirror 6 and to the housing of the copier 1 in a suitable manner.

The objective 4 which is only provided for the purposes of the invention, can be releasably mounted in order to allow the application of the copier 1 as normal office copier. The objective 4 for example can be removed in conjunction with arm 5. The deflection mirror 6 can be also releasably mounted, and the arm 5 in connection with the objective 4 and the mirror 6 can be offered in the trade as retro-fit equipment.

Instead of the shown objective 4 which merely includes a focus adjustment and a diaphragm adjustment, also a so-called zoom can be provided which includes an additional adjustment of the depth of the focus field. By this, also the reduction scale can be changed. It is clear that for such adjustment purposes also the exposing device of the copier 1 can be used which normally includes an objective having a diaphragm adjustment and in the most cases also adjustment means for the depth of the focus field. Finally, automatic foxusing means can also be provided.

The copier according to the invention as well as the cited known copying device mentioned above, includes a plate- or sheet-like Fresnel lens as a part of its exposing device onto which the objective 4 forms an image, the Fresnel lens being placed on the entrance window 2 of the copier and serving for a uniformly directed illumination of the formate. This effect necessitates diffusing screen-like grounding of the back surface of the Fresnel lens.

Figure 2:
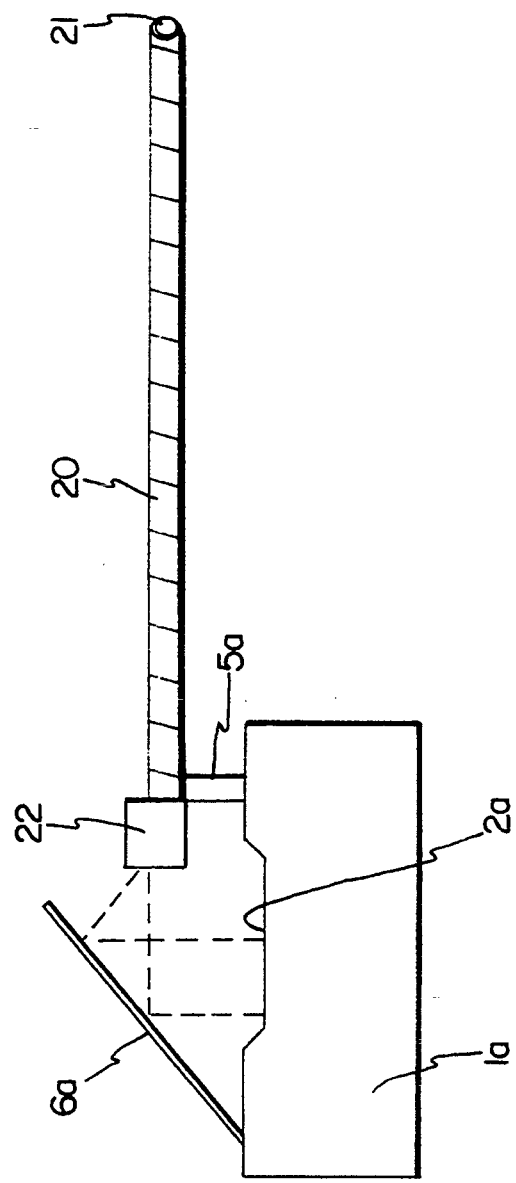
FIG. 2 diamatically shows a copier according to the invention including a fibre optical means.

FIG. 2 diagrammatically shows a copier 1a which above its entrance window 2a includes a deflection mirror 6a like mirror 6 of FIG. 1. The arm 5a releasably mounted on the top surface of the copier 1a retains a light fibre conductor 20 which at the front end has an objective 21 or lens in a manner as known per se. The light conductor 20 can for instance serve for medical entroscopying. The other end of the light conductor 20 is connected to an optical device 22 which for example may include a light amplifier from which the optical beam is transmitted to the deflection mirror 6a.

It has to be noticed with respect to FIG. 1 that a further deflection mirror 12 ( in dash-dotted lines) can be provided in order to form an image of an object on an image surface 13 by the objective 4. By this, the object is copied in the copier 1 in the correct position if the copier 1 does not include converting means by which the images can be turned about 180°.

I claim:

1. A camera attachment for an electrophotographic copying machine having a housing including an upper surface with a generally horizontally disposed image entrance window and an exposing device within the housing behind the image entrance window, the attachment comprising:

an upward extending arm releasably mountable upon the housing;

an objective lens mounted upon the arm, having a freely accessible incident light receiving optical surface, and an optical axis which is generally parallel to the upper surface when the arm is mounted on the housing;

a releasably mountable reflective surface, disposed at angles of about 45° to the axis of the objective and the upper surface of the housing;

and wherein the objective, reflective surface, and entrance window are arranged, such that reflected light from a remote illuminated opaque object enters the freely accessible optical surface and is directed by the objective lens and the reflective surface to form an original two-dimensional image upon the entrance window detectable by the exposing device for reproduction by the electrophotographic copying machine.

2. An optical device for forming a reproducible visual image on an image entrance window for an exposing device of an electrophotographic copying machine, of an illuminated opaque object positioned externally and remote from the copying machine and optical device, wherein the image entrance window is positioned in a first plane and wherein the illuminated opaque object is positioned in a second plane which is oriented substantially perpendicular to the first plane, with the optical device including a camera objective adapted to form the visual image from reflected light incident upon an exposed optical surface of the camera objective, the camera objective directly transmitting the visual image of the opaque object to a reflective means positioned externally of the copying machine, the reflective means in turn directly transmitting the visual image onto the image entrance window of the exposing device, such that the visual image remains in visual form throughout formation of the reproducible visual image on the image entrance window of the exposing device of the Copying machine.

* * * * *

UNITED STATES PATENT AND TRADEMARK OFFICE
CERTIFICATE OF CORRECTION

PATENT NO. : 5,357,316
DATED : October 18, 1994
INVENTOR(S) : GEORG-ULRICH KEMPF It is certified that error appears in the above-indentified patent and that said Letters Patent is hereby corrected as shown below:

Col. 2, line 7, delete "images", insert --image--

Col. 4, line 51, delete "Copying", insert --copying--

Signed and Sealed this

Twenty-eight Day of February, 1995

Attest:

BRUCE LEHMAN

*Attesting Officer*   *Commissioner of Patents and Trademarks*